(No Model.) 6 Sheets—Sheet 1.

N. L. ANDERSON.
TYPE WRITING MACHINE.

No. 575,195. Patented Jan. 12, 1897.

Attest:
F. H. Schott
A. M. Parkins

Inventor:
N. L. Anderson,
By Jennie & Goldsborough,
Attys.

(No Model.)   6 Sheets—Sheet 2.
N. L. ANDERSON.
TYPE WRITING MACHINE.
No. 575,195.   Patented Jan. 12, 1897.
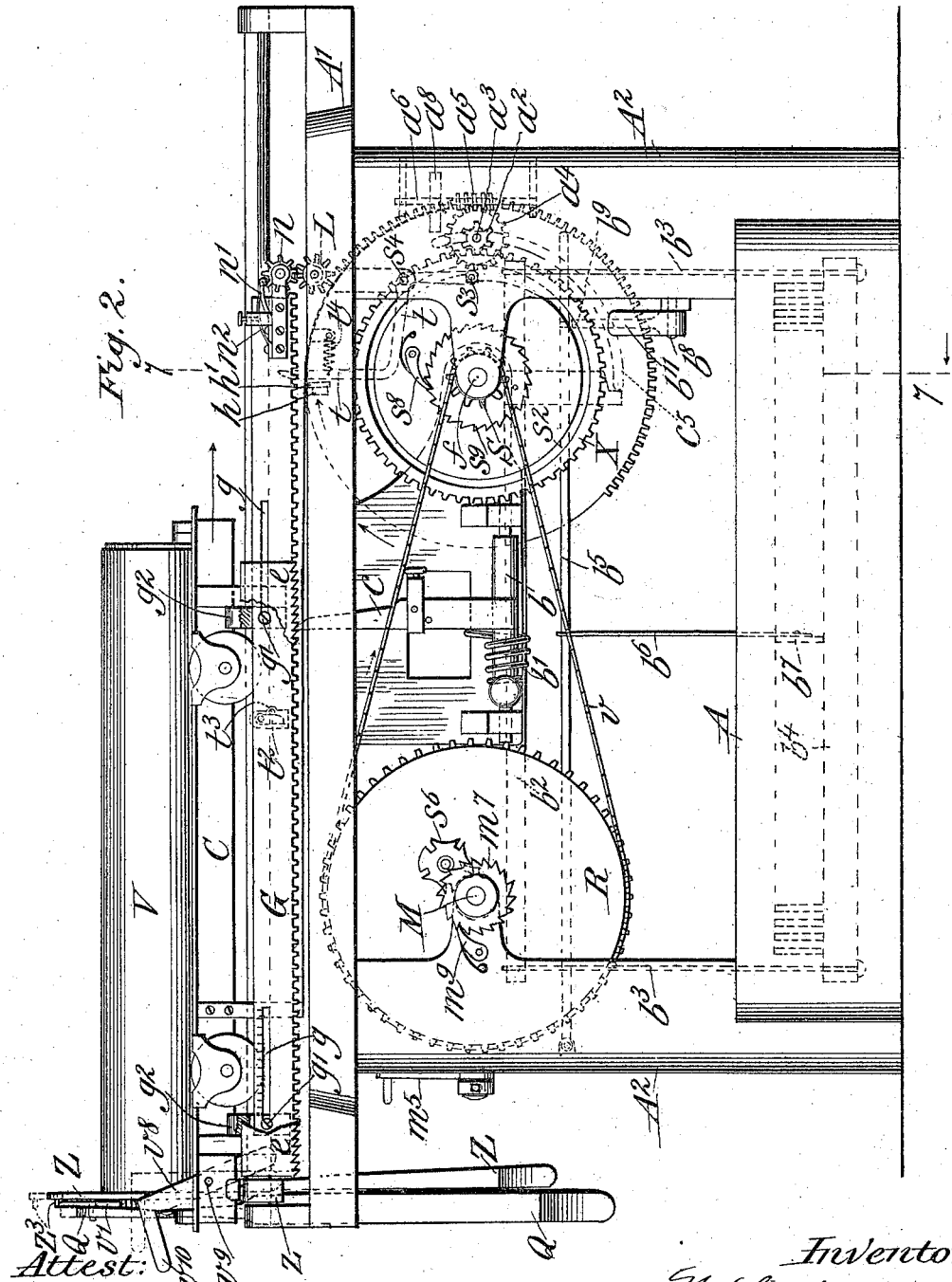

(No Model.) 6 Sheets—Sheet 3.
N. L. ANDERSON.
TYPE WRITING MACHINE.
No. 575,195. Patented Jan. 12, 1897.
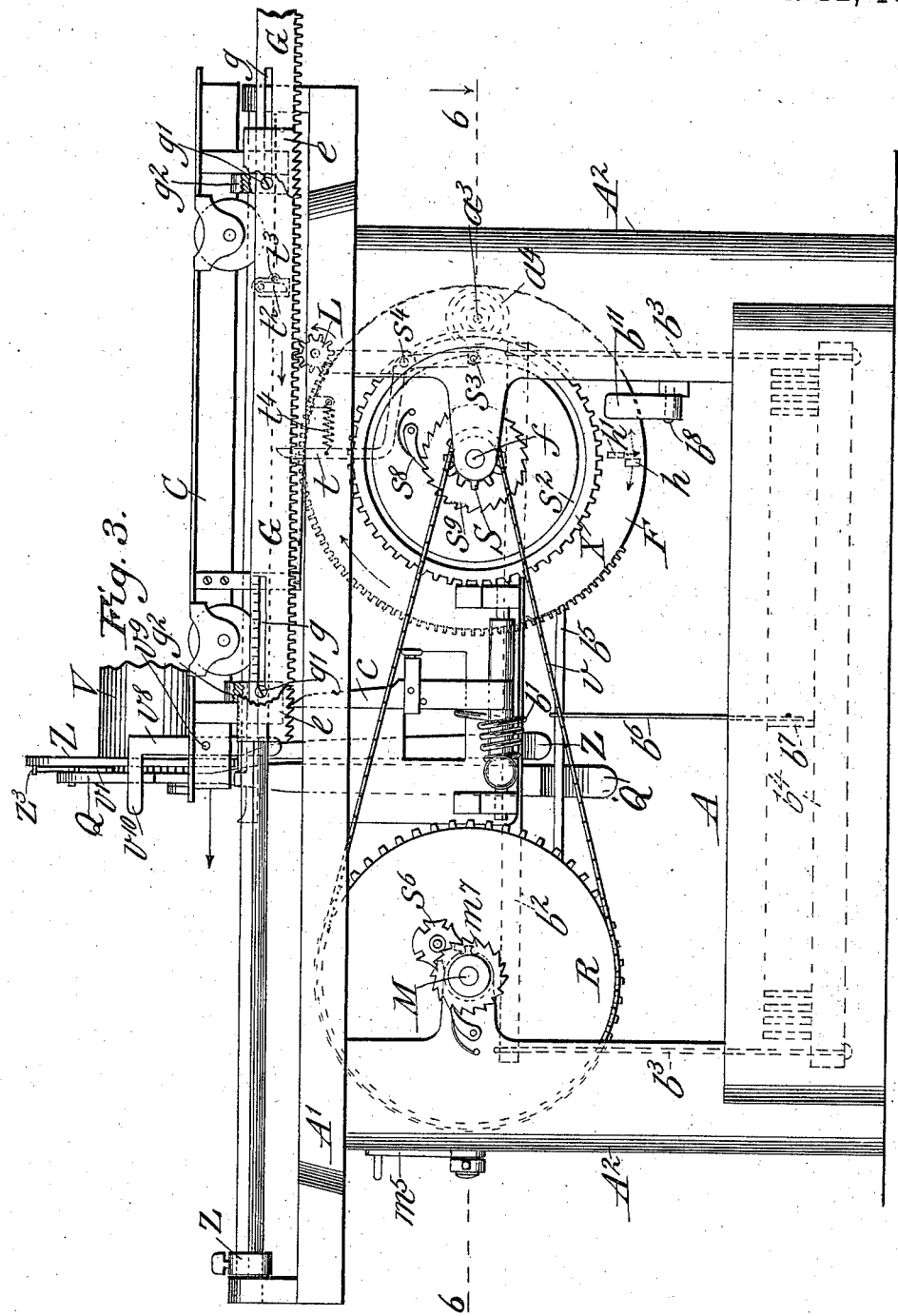
Attest:
H. H. Schott
A. M. Parkins.
Inventor:
N. L. Anderson,
By Keene & Goldsborough
Attys.

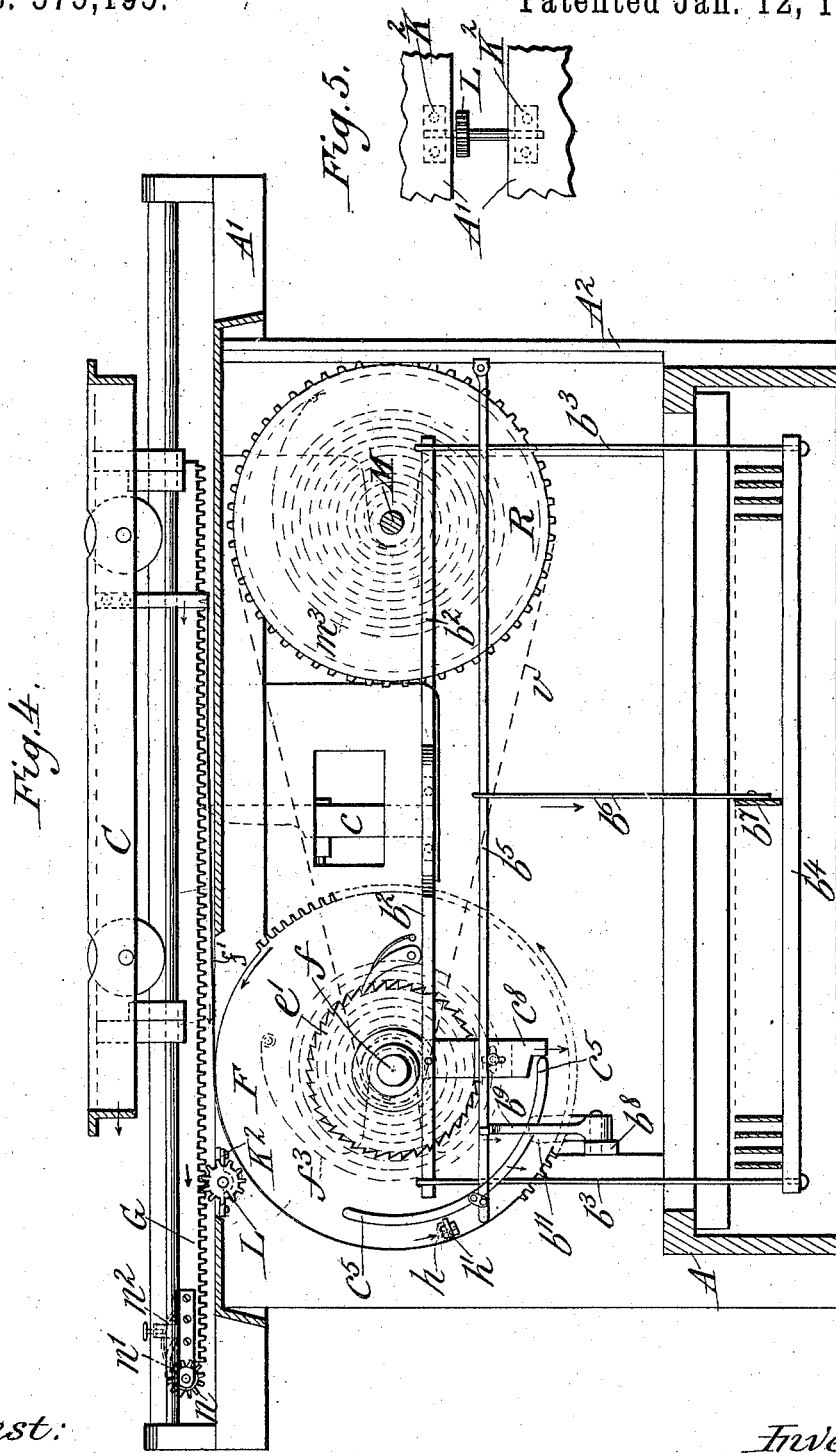

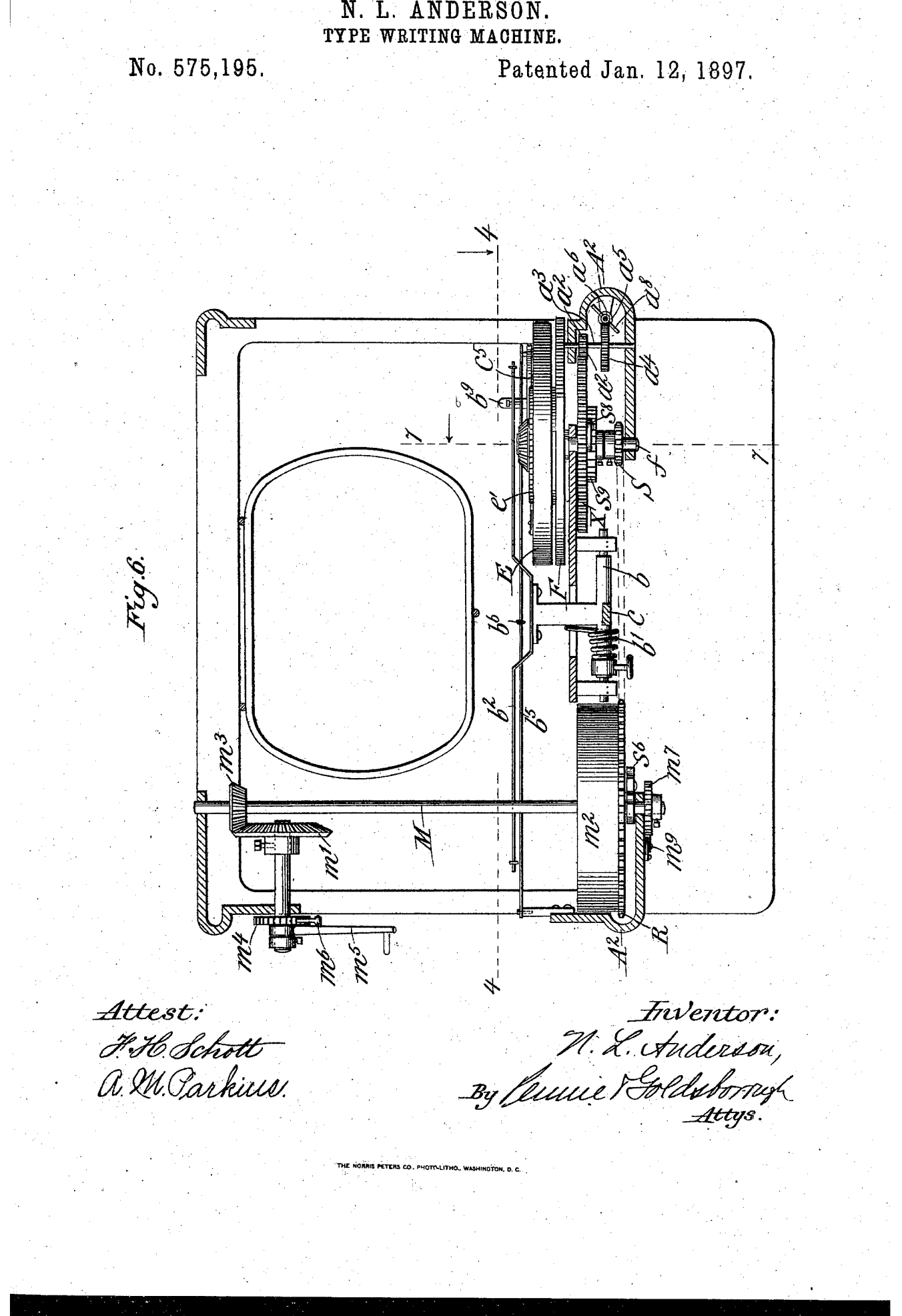

(No Model.)

N. L. ANDERSON.
TYPE WRITING MACHINE.

No. 575,195.                             Patented Jan. 12, 1897.

6 Sheets—Sheet 5.

Fig. 6.

Attest:
F. H. Schott
A. M. Parkins

Inventor:
N. L. Anderson,
By Cennie V. Goldsborough
Attys.

(No Model.)  6 Sheets—Sheet 6.

N. L. ANDERSON.
TYPE WRITING MACHINE.

No. 575,195. Patented Jan. 12, 1897.

Attest:
F. H. Schott
A. M. Parkins

Inventor:
N. L. Anderson,
By Jennie V. Goldsborough
Attys.

UNITED STATES PATENT OFFICE.

NEAL LARKIN ANDERSON, OF MONTGOMERY, ALABAMA.

TYPE-WRITING MACHINE.

SPECIFICATION forming part of Letters Patent No. 575,195, dated January 12, 1897.

Application filed February 7, 1896. Serial No. 578,307. (No model.)

*To all whom it may concern:*

Be it known that I, NEAL LARKIN ANDERSON, a citizen of the United States, residing at Montgomery, in the county of Montgomery and State of Alabama, have invented certain new and useful Improvements in Type-Writing Machines; and I do hereby declare the following to be a full, clear, and exact description of the invention, such as will enable others skilled in the art to which it appertains to make and use the same.

In Letters Patent of the United States granted to me February 11, 1896, I have described and claimed a type-writing machine wherein the return of the platen to its initial position is effected automatically at the end of a line of print by the same propelling-spring employed for advancing the platen in its forward step-by-step movement. In the machine described in the patent referred to energy is automatically restored to the propelling-spring from a second spring adapted to be wound from time to time (as, for instance, at the end of a page of print) and constituting a reservoir of power, a portion of which is transferred to the propelling-spring at each return movement of the carriage.

A further feature of the invention consisted in a particular means for automatically effecting the line-spacing.

The object of my present invention is to greatly simplify the structure and lessen the cost of manufacture of the machine, while still preserving its characteristic general mode of operation.

Figure 1:
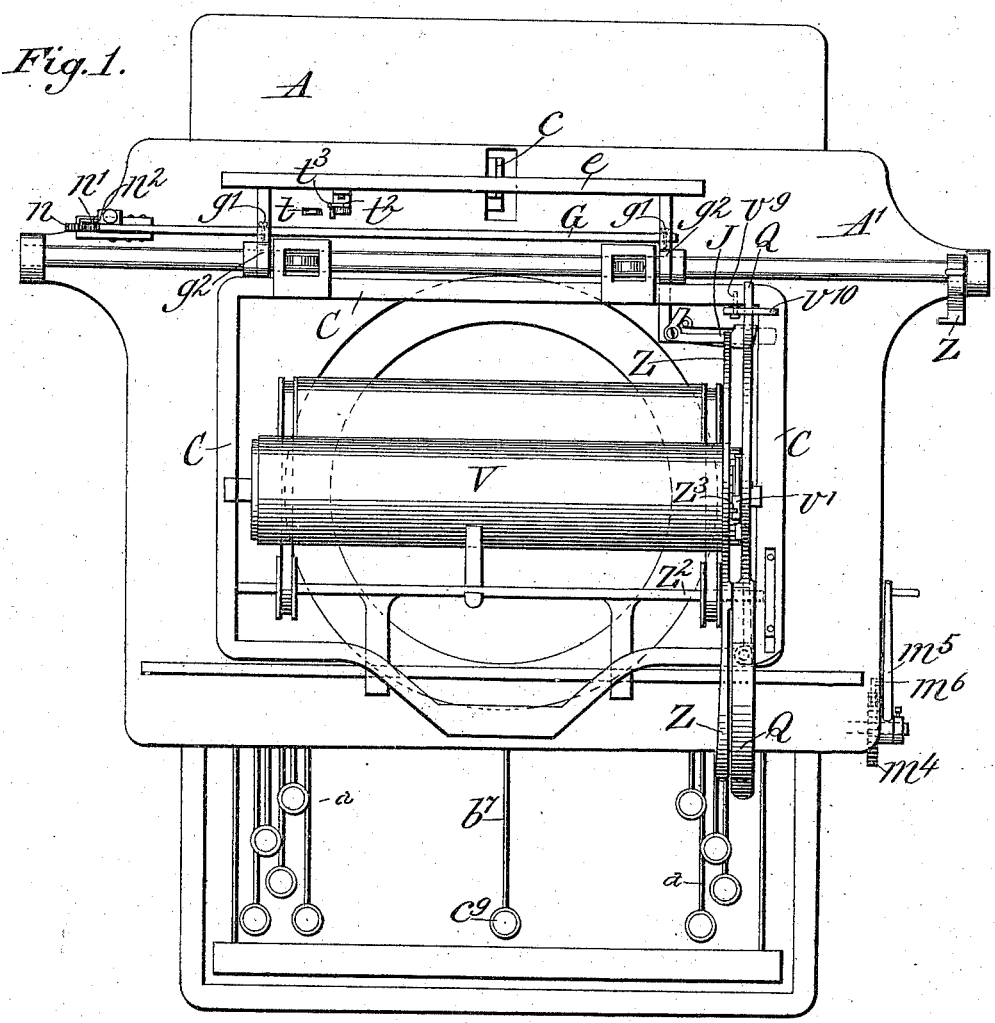
Figure 7:
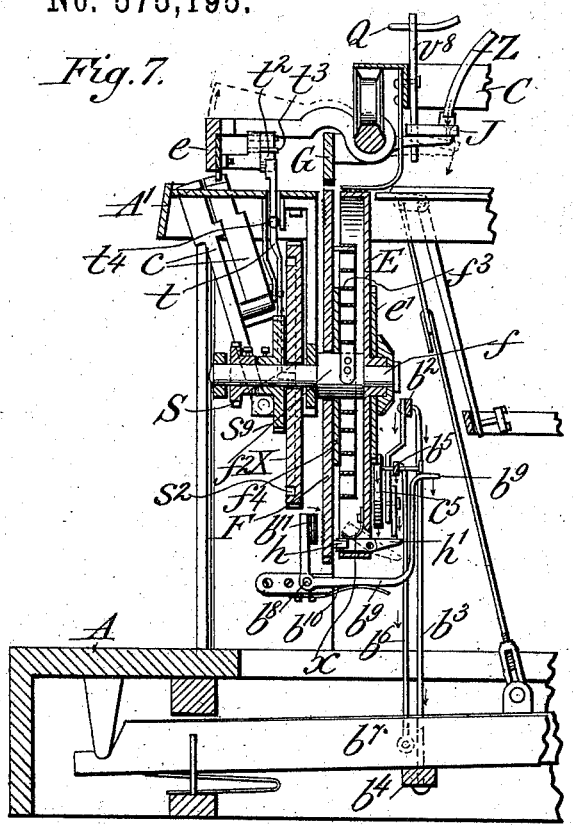
Figure 8:
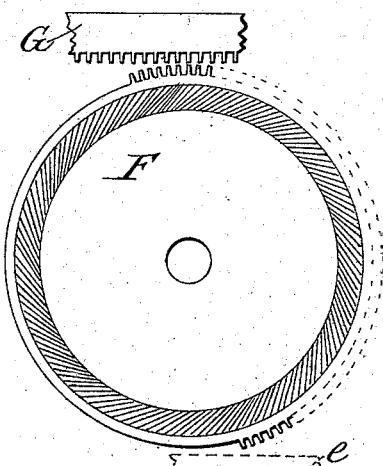
Figure 9:
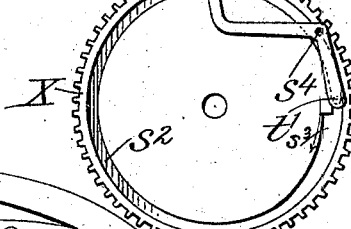
Figure 10:
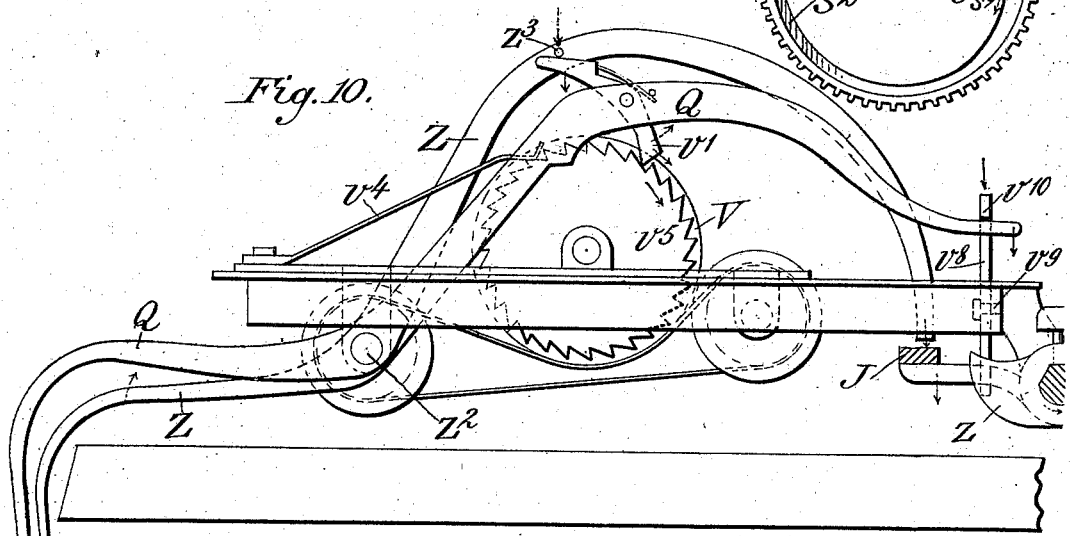

In the accompanying drawings, Figure 1 represents a top plan view of a type-writing machine embodying my improvements, certain parts of the machine unnecessary to the understanding of the present invention being omitted. Fig. 2 represents, on a somewhat larger scale, a rear elevation of the machine, partly in section and partly broken away, the carriage being shown in position to begin its movement in printing a line. Fig. 3 represents a similar view, partly in section, showing the carriage on its return movement after the line has been written. Fig. 4 represents a sectional elevation of the machine on the line 4 4 of Fig. 6, with the carriage in an intermediate position. Fig. 5 represents a detail plan view of the pinion which transmits return movement to the carriage and shows the bearings for the pinion-shaft. Fig. 6 represents a horizontal section on the line 6 6 of Fig. 3. Fig. 7 represents a section on the line 7 7 of Figs. 2 and 6. Fig. 8 represents a detached elevation of the power-wheel, showing its relation to the rack-bar. Fig. 9 represents in detail a part of the mechanism for storing energy in the carriage-actuating spring when desired or automatically during the return movement of the carriage. Fig. 10 represents in side elevation the means for automatically effecting the line-spacing.

Similar letters of reference indicate similar parts throughout the several views.

As in my former patent, so also in this, I have shown for purposes of illustration my invention as applied to the well-known double-case Remington machine No. 2, and have omitted from the drawings such parts of the machine as are not needed to illustrate my invention. I desire it to be understood, however, that I do not limit myself to this particular type of machine, as it will be obvious to those skilled in the art that the improvements may be applied to other machines of the same general class.

Referring to the drawings, A represents the frame, within which the keys $a$ are mounted, of the usual character. A' represents the top plate of the frame, and $A^2$ the supporting and connecting uprights therefor. The rock-shaft $b$, the dogs $c$, and the tension-spring $b'$, in connection with the rocker-bar $b^2$, links $b^3$, and universal bar $b^4$, constitute the usual escapement for the rack-bar $e$ of the platen-carriage C. The rack-bar $e$ is adapted to be tilted out of engagement with the dogs $c$.

A drum E, mounted loosely upon an arbor $f$ and provided with a flexible strap $f'$, extending from the drum-periphery to a projection from the carriage C, occupies the position usually occupied by the spring-actuating drum of the ordinary Remington No. 2 machine, and turns upon the shaft in the way the usual spring-drum turns and in the same direction during the writing of a line. Inasmuch as the drum thus revoles in the same direction with the carriage, I am enabled to dispense with the employment of the friction-roller required in my former construction, wherein the drum rotated in the opposite direction, and consequently the wear and strain on the flexible strip is correspondingly lessened. The drum is provided with a hub such as is used on the usual mainspring-drum of the Remington machine, and on this hub turns the usual ratchet $e'$. The shaft $f$ is provided with a collar $f^2$, (see Fig. 7,) to which one end of coil-spring $f^3$ is connected, the opposite end of said coil-spring being connected to a wheel F, mounted loosely upon the collar $f^2$. A washer $f^4$ is interposed between the wheel F and the spring $f^3$.

About one-half of the periphery of the wheel F is provided with cog-teeth having a pitch of one-tenth of an inch. Instead of being located so as to mesh with the toothed bar G, as in my former construction, the teeth of the wheel F are adapted to mesh with a pinion L, mounted in bearings attached to the frame of the machine and readily removable, so that the pinion may be conveniently replaced by another when worn. The pinion L is itself adapted to mesh with the toothed bar G, said bar being provided with longitudinal slots $g$ and being connected to the bearings of the spacing-ratchet $e$ by means of headed screws $g'$ entering the lugs $g^2$. One of these screws may conveniently serve as a set-screw to determine, in conjunction with the adjacent scale, the desired adjustment of the margin used in writing.

The relative position and function of the drum E and wheel F with respect to each other are substantially the same as in my former construction. Thus the wheel F is provided near its periphery with the same pin $h$, projecting within the rim of the drum, the drum being provided with a coöperating pivoted pin $h'$, which is held in position by the spring $x$, so that the said pin $h'$ normally occupies the position indicated in full lines in Fig. 7. So, also, to one of the uprights $A^2$ is pivoted the bar $b^5$, connected by the link $b^6$ with the lever-arm $b^7$ of the auxiliary key $c^9$. The bar $b^5$ connects with a rock-arm $b^9$, fulcrumed upon a stud $b^8$, and terminating at its free end in the form of a brake-shoe $b^{11}$, having a hard-rubber facing adapted to bear upon the surface of the wheel F, instead of upon the periphery thereof, as in my former construction. It will of course be understood that the shoe $b^{11}$ serves as a gentle brake upon the wheel F when the auxiliary key is depressed for the purpose of releasing the wheel F. At other times it is normally held out of engagement with the wheel by means of the spring $b^{10}$. To increase the efficacy of the brake, the contact-surface of the wheel may be slightly roughened, as indicated by the hatching in Fig. 8. The crescent-shaped tripping-arm $c^5$ is now mounted directly upon the bar $b^5$, a feature constituting an important simplification.

The operation of the parts thus far described will be readily apparent to one familiar with my former construction. Thus while a line is being written the drum E turns in the direction indicated by the arrow in Fig. 2. This motion is communicated to the drum E, which is loose on the shaft $f$, from the wheel F by means of the pin $h$ coming into contact with the pin $h'$. As each key is struck the drum E draws the carriage, by means of the band $f'$, from the right to the left hand side of the type-writing machine step by step. This movement is not interfered with by the pinion L or the wheel F, from the fact that while the carriage is moving from right to left the milled-out portion of the wheel F is next to the pinion L. When the end of the line has been reached, the last key struck (no matter which it may be) brings the trip-lever $c^8$, which projects downwardly from the bar $b^2$, into contact with the pin $h'$, thereby throwing said pin out of engagement with the pin $h$. The pin $h$ is at once carried beyond the pin $h'$, and the drum is now free to move in a direction contrary to its former path of revolution. This reverse movement of the drum E is caused by the return of the carriage to the right-hand side of the machine, for at the same moment that the pin $h$ is released from engagement with the pin $h'$ the teeth on the wheel F gear with the pinion L, thereby reversing the direction of rotation of said pinion and driving the carriage from the left to the right, i. e., to the beginning of the line. As the right-hand side of the machine is nearly reached the pin $h$ again approaches the pin $h'$, and when the return movement has been fully accomplished the pinion L passes out of engagement with the wheel F and the pin $h$ comes into contact again with the pin $h'$.

Should the operator desire to return the carriage to the beginning of a new line from any point in the line beyond, say, number "20" on the front scale of the type-writing machine, and without going entirely to the end of the line, a stroke of the auxiliary key $c^9$ will accomplish the purpose by bringing the crescent-shaped trip $c^5$ against the pin $h'$, thus releasing the pin $h$ and thereby disengaging the wheel F from the drum E. The wheel F thus released continues its revolution, bringing the cogs on its periphery into engagement with the pinion L and returning the carriage to the left, as above described. The wheel F, being frequently released from engagement with the drum E when the carriage is at some distance from the end of the line, would have to describe an arc of considerable amplitude before its first cog came into engagement with the cogs on the pinion L. Consequently the first cog to come into engagement with the pinion L would receive a sharp blow from the sudden impact. To obviate this, the brake-shoe $b^{11}$ is brought against the roughened face of the wheel F at the same time that the pin $h'$ is released from engagement with the pin $h$ by means of the auxiliary key, and thus serves as a gentle brake for the wheel F.

The mechanism for storing spring-power and transferring it to the propelling-spring $f^3$ is materially simplified in the present construction. Thus at the left of the wheel F (looking at the rear of the machine) I mount a sprocket-wheel R, to which is made fast the spring-barrel $m^2$. The spring $m^3$, inclosed in this barrel, is a long and flexible one and is made fast at one end to the inner periphery of the barrel and at the other end to the winding-shaft M, which passes through the barrel and is mounted to revolve in the frame. The shaft M is provided with the ratchet $m^7$, fixed thereon, and, coöperating with the back-stop spring-pawl $m^9$ and a Geneva stop $s^6$, prevents overwinding. A sprocket-chain $v$ connects the sprocket-wheel R with a smaller sprocket-wheel S, fixed upon the shaft $f$, so that the tendency is constantly to wind up the spring $f^3$.

I preferably make the relative sizes of the sprocket-wheels R and S as five to one, so as to multiply the gearing ratio, thereby avoiding the necessity of frequent winding up of the shaft M, and for the same reason I make the bevel-gear $m'$ twice the diameter of the gear $m^3$. The gear $m'$ is rotated by means of an operating-handle $m^5$, provided with a push-pawl $m^6$, engaging the ratchet $m^4$.

Upon the shaft $f$ and between the wheel A and wheel F is the cam-wheel X. This cam-wheel is provided with a slot $s^2$, cut in its face. The slot is cut in a true circle concentric with the periphery of the wheel X, except at $s^3$, where it terminates in a cut-out portion. To the frame of the machine is pivoted at $s^4$ a bell-crank lever $t$, which passes through the top plate of the frame. On the lower end of this bell-crank is a pin $t'$, and on the inner side of the spacing-ratchet $e$ is the trip-pawl $t^2$, having a back-stop pin $t^3$.

The cam-wheel X is loose upon the shaft $f$ and, in connection with the trip, is designed to govern the transmission of tension to the spring $f^3$. On its face it is provided with a spring-pawl $s^8$, engaging with a ratchet-wheel $s^9$, fixed upon shaft $f$, and on its periphery it is provided with cog-teeth adapted to engage with a pinion $a^2$, fixed upon a staff $a^3$. The staff $a^3$ has also fixed upon it a worm-wheel $a^4$, meshing with a worm $a^5$ upon an arbor $a^6$, which arbor is provided with the usual small fly or fan-governor $a^8$, such as is used in music-boxes to regulate the speed. It will of course be understood that this mechanism is for the purpose of regulating the speed when the winding mechanism is at work.

The general operation of the power storage and transfer is similar to that of my former construction. The power-spring is wound up by giving several revolutions to the winding-rod M by means of the operating-handle $m^5$ and its connecting-shaft and gearing, and the energy thus stored is transmitted to the mainspring on the master-shaft by releasing the trip $t^2$ and holding it out of engagement with the slot in the cam-wheel until the desired tension has been secured in the mainspring. By releasing the trip this energy or tension supplied to the mainspring is maintained automatically during the writing, for when the end of a line is reached and the carriage is thrown back automatically by the trip-lever $c^8$ coming into contact with the pin $h'$ (or at some other portion of the line by the striking of the paragraph-key) the carriage returns toward the beginning of the line, as hereinbefore set forth, whereupon the trip $t^2$ strikes the bell-crank lever $t$, thus releasing the pin $t'$ from the notch $s^3$. Thereupon the spring $m^3$, through the intermediacy of the sprocket-gearing, winds the spring $f^3$. The spring $t^4$ holds the lever $t$ in the slot $s^2$ in such manner that when the gear S is revolved once the pin $t'$ again engages with the notch $s^3$ and stops the further action of the spring $m^3$. In this manner the spring $f^3$ is wound once with each complete revolution of the cam-wheel X, this being exactly sufficient to maintain the energy it had when the line was begun. Overwinding is prevented by the Geneva stop $s^6$, and in gearing of the size shown in the drawings about three revolutions of the rod P are sufficient for an entire page of twenty-seven lines written on the Remington machine No. 2. The number of revolutions necessary to wind the rod for writing a page may be decreased by changing the size of the gears $m'$ $m^3$.

The ratchet-and-pawl connection between the shaft $f$ and cam-wheel X enables the tension of the spring $f^3$ to be adjusted with great nicety, so as to suit the touch of different operators. Thus if the operator desires to increase the tension considerably he simply trips the lever $t$, thus allowing the spring $m^3$ to wind the spring $f^3$ one additional revolution. If, however, he simply desires a little more power in the mainspring, he trips the lever $t$ and at the same time checks the movement of the storage mechanism by means of the fan-governor. He then turns the cam-wheel X to the left a quarter, third, half, or any fraction of a revolution, according to the additional strength of tension desired, and, having done so, releases the fan-governor, allowing the storage mechanism to put the mainspring under additional tension.

It is obvious that if the operator has turned the cam-wheel X three-quarters of a revolution the storage-spring $m^3$ can wind the spring $f^3$ only a quarter of a revolution before it is shut off by the slot and lever $t$. If he has turned the wheel only a half of a revolution, the spring $f^3$ will be put under an additional tension of half a revolution by the storage-spring, &c.; and since the tension once regulated is maintained uniform it is seen that the operator can at any time adjust his machine to suit himself.

In order to effect the automatic turning of the carriage-platen V, so as to space for the succeeding line, I provide devices more particularly shown in Figs. 1, 2, 3, 7, and 10 of the drawings. The platen V is provided with the customary ratchet $v^5$ and back-stop pawl $v^4$, and is adapted to be operated manually, if desired, by the lever Q and driving-pawl $v'$. In order to effect the spacing automatically, however, an angular lever $v^8$ is pivoted to the frame of the carriage at $v^9$ and is provided with an overhanging arm $v^{10}$. The free end of the lever Q extends in a plane transverse to the plane of the lever $v^8$ and at an elevation slightly lower than that of the arm $v^{10}$. When the carriage returns to the beginning of a line, the lower end of the lever $v^8$ comes in contact with a stop or abutment $z$, thereby rocking the lever $v^8$ and turning the platen correspondingly to effect the desired line-spacing. In many instances it is desirable to return the carriage to a desired point in the line without spacing, as, for instance, when it is desired to make a correction in the printed line. For this purpose I employ an additional hand-lever Z, adapted to rock upon the same rod $z^2$ upon which the hand-lever Z is mounted and extending up from the platen V and thence downwardly, as shown, until it almost comes into contact with the end J of the trip of the spacing rack-bar.

It is obvious that when the operator wishes to return to the beginning of the line without spacing the platen he can effect that purpose by operating the lever Z. Thus upon operating the lever Z a pin $z^3$ upon said lever presses upon the pawl $v'$ and releases said pawl from the ratchet $v^5$, so that the return of the carriage to the beginning of the line is not accompanied with an automatic spacing of the platen, for the reason that the line-space pawl being held out of engagement with the ratchet fails to revolve the platen. The lever Z therefore subserves the function of a release-key and being provided with a hand-lever enables the operator to move the platen either to the right or left, as desired, without spacing the line. On the other hand, if the operator desires to space the line without returning the carriage to the initial position the hand-lever Q may be employed for that purpose.

By the expression "line of print," as used herein, I mean a line of any length, whether extending entirely across the page or only part way across, as, for instance, at the end of a paragraph. It will also be understood that the beginning of the line of print, to which the carriage is returned continuously, is not necessarily the line beginning with the numeral "0" on the scale of the type-writer, but any predetermined point to which the operator may wish to return the carriage, as, for instance, the numeral "5" on the scale.

Having thus described my invention, what I claim is—

1. In a type-writing machine, the combination with the platen-carriage, of a power-wheel having cog-teeth upon a portion of its periphery, a shaft upon which said wheel is loosely mounted, a volute spring connecting the wheel and shaft, a band-wheel mounted loosely on the shaft and connected to the carriage by a flexible band, a fixed pin on the power-wheel, a coöperating movable pin upon the band-wheel, a trip for moving the movable pin out of line with the fixed pin, a toothed bar connected with the carriage, and a pinion engaging the toothed bar and located in the path of movement of the power-wheel teeth; substantially as described.

2. In a type-writing machine, the combination with the platen-carriage, toothed power-wheel, and band-wheel, said power-wheel and band-wheel being coupled by a fixed pin and coöperating movable pin, of a trip for the movable pin consisting of a crescent-shaped arm, normally out of line with the movable pin, a lever-arm fulcrumed to the frame of the machine and upon whose free end the crescent-shaped arm is mounted, and a key for advancing said crescent-shaped arm to trip the movable pin; substantially as described.

3. In a type-writing machine, the combination with the platen-carriage, toothed power-wheel, and band-wheel, said power-wheel and band-wheel being coupled by a fixed pin and coöperating movable pin, of a trip for the movable pin consisting of a crescent-shaped arm, normally out of line with the movable pin, a lever-arm fulcrumed to the frame of the machine and upon whose free end the crescent-shaped arm is mounted, and a key for advancing said crescent-shaped arm to trip the movable pin, said key being connected to the lever-arm at a point intermediate of the fulcrum of said lever-arm and the crescent-shaped arm; substantially as described.

4. In a type-writing machine, the combination with the platen-carriage of a power-wheel mediately coupled thereto at the initial position of the carriage, a trip for disengaging the coupling, gearing intermediate of the power-wheel and carriage adapted to intermesh and return the carriage, upon the operation of the trip, auxiliary power-storage mechanism for supplying energy to said power-wheel with each return of the carriage, means for regulating said supply so as to restore to the power-wheel on each return of the carriage its original energy, said means consisting of a cam-wheel on the master-shaft of the power-wheel, a stop engaging therewith, and a trip in the path of the return movement of the carriage and means for regulating the tension of the spring on the power-wheel, said means consisting of a spring-pressed pawl on the surface of the cam-wheel and a ratchet-wheel engaging with said pawl, on the master-shaft of the power-wheel; substantially as described.

5. In a type-writing machine, the combination with the master-shaft of the power-wheel, of a cam-wheel loose on the shaft, a spring-pressed pawl on the surface of said cam-wheel, and a ratchet fastened to the master-shaft and engaging with said pawl, said cam-wheel engaging with the pinion-wheel of a fan-governor; substantially as shown and described.

6. In a type-writing machine, the combination with the platen-carriage, of a power-wheel mediately coupled thereto, at the initial position of the carriage, a trip for engaging the coupling, gearing intermediate of the power-wheel and carriage, adapted to intermesh and return the carriage to the beginning of the line on the operation of the trip, and auxiliary power-storage mechanism for supplying with each return of the carriage energy sufficient both to forward the carriage and reverse it, said mechanism consisting of a spring-motor, geared to the said power-wheel by means of an endless chain and sprocket-wheels on the master-shaft of the power-wheel and the shaft of the spring-motor respectively; substantially as described.

7. In a type-writing machine, the combination with the platen-carriage, of a power-wheel mediately coupled thereto, at the initial position of the carriage, a trip for engaging the coupling, gearing intermediate of the power-wheel and carriage, adapted to intermesh and return the carriage to the beginning of the line on the operation of the trip, and auxiliary power-storage mechanism for supplying with each return of the carriage energy sufficient both to forward the carriage and reverse it, said mechanism consisting of a spring-motor, geared to the said power-wheel by means of an endless chain and sprocket-wheels on the master-shaft of the power-wheel and the shaft of the spring-motor respectively, said main shaft of the spring-motor being connected with a key-winding rod having a hand-lever, by means of bevel-gear, the gear on the main shaft being smaller than the gear on the winding-lever, whereby the number of revolutions needed to wind the spring-motor is reduced; substantially as described.

8. In a type-writing machine, the combination with the platen-carriage, toothed power-wheel, and band-wheel, said power-wheel and band-wheel being coupled by a fixed pin and coöperating movable pin, of a trip for the movable pin consisting of a crescent-shaped arm, normally out of line with the movable pin, and a key for advancing said crescent-shaped arm and causing it to trip the movable pin, and a brake-shoe likewise connected with said key and brought into action simultaneously with the operation of said trip, said brake-shoe being mounted to swing in a plane transverse to the power-wheel so as to bear upon the flat surface of the wheel; substantially as described.

9. In a type-writing machine, the combination with the platen-carriage, toothed power-wheel, and band-wheel, said power-wheel and band-wheel being coupled by a fixed pin and coöperating movable pin, of a trip for the movable pin consisting of a crescent-shaped arm, normally out of line with the movable pin, and a key for advancing said crescent-shaped arm and causing it to trip the movable pin, and a brake-shoe likewise connected with said key and brought into action simultaneously with the operation of said trip, said brake-shoe being mounted to swing in a plane transverse to the power-wheel so as to bear upon the flat surface of the wheel, the wheel being roughened upon the surface on which the brake-shoe bears; substantially as described.

10. In a type-writing machine, the combination with the trip for the spacing rack-bar, of a releasing hand-lever adapted to operate the trip, a lever and driving-pawl for the platen-ratchet, the tail of the driving-pawl being located in the path of movement of the releasing hand-lever, whereby the rack-bar can be released from the escapement-dogs, and the carriage moved either back and forth on the line or to the beginning of the line and the driving-pawl simultaneously thrown out of engagement with the ratchet, so that the platen cannot be automatically actuated during said movement; substantially as described.

In testimony whereof I affix my signature in presence of two witnesses.

NEAL LARKIN ANDERSON.

Witnesses:
ARTHUR PELZER,
N. P. CATLETT.